US00RE38232E

(19) United States
(12) Reissued Patent
Rome et al.

(10) Patent Number: US RE38,232 E
(45) Date of Reissued Patent: Aug. 26, 2003

(54) METHOD AND APPARATUS FOR SERVICING ENGINE COOLING SYSTEMS

(75) Inventors: John Rome, Huntington Beach, CA (US); Eduardo Betancourt, Long Beach, CA (US)

(73) Assignee: Motorvac Technologies, Inc., Santa Ana, CA (US)

(21) Appl. No.: 09/953,326

(22) Filed: Sep. 13, 2001

Related U.S. Patent Documents

Reissue of:
(64) Patent No.: 6,213,175
Issued: Apr. 10, 2001
Appl. No.: 09/427,132
Filed: Oct. 25, 1999

U.S. Applications:
(63) Continuation-in-part of application No. 09/184,621, filed on Nov. 2, 1998, now Pat. No. 6,062,275.

(51) Int. Cl.[7] ..... B65B 1/04
(52) U.S. Cl. ..... 141/98; 141/65; 141/59; 184/1.5
(58) Field of Search ..... 141/98, 4, 5, 7, 141/65, 59; 184/1.5

(56) References Cited

U.S. PATENT DOCUMENTS 4,109,703 A * 8/1978 Babish et al. ..... 134/102.1
4,366,069 A * 12/1982 Dudrey et al. ..... 210/138
5,318,700 A * 6/1994 Dixon et al. ..... 123/41.01
5,370,160 A * 12/1994 Parker ..... 134/166 C
5,447,184 A * 9/1995 Betancourt ..... 134/169 C
5,626,170 A * 5/1997 Parker ..... 134/166 R
5,853,068 A * 12/1998 Dixon et al. ..... 134/169 A

OTHER PUBLICATIONS

SPX Robinair Product announcement for model 75650 AF Pro Coolant Recycler and model 75600 AF Pro Coolant Exchanger; www.robinar.com; Aug. 27, 1999.*
White Industries Automotive Coolant Exchanger and Recycler Product Model DF2000; www.whiteac.com; Aug. 27, 1999.*
Solar Product Model 5050; www.solarline.com;Aug. 27, 1999*
Goodall MFG, LLC Pro Tec Drain/Fill Product Model 54–110; www.goodallmfg.com; Oct. 18, 1999.*
Wynn Oil Company Power Drain & Fill/Bulk Recycler Product Description; 1992.*
Wynn Oil Company Cooling System Flush and Fill Machine Product Model DEX–Flush 2100 Specification Sheet (no date).*

* cited by examiner

*Primary Examiner*—Steven O. Douglas
(74) *Attorney, Agent, or Firm*—Farjami & Farjami LLP

(57) ABSTRACT

Method and apparatus, for servicing engine cooling systems, including a service inlet, a vacuum pump, a two-way solenoid interposed between the vacuum pump and the service inlet, a service outlet, a disposal hose, a new fluid tank, a pressure pump interposed between the service outlet and the new fluid tank, a three-way solenoid interposed between the service outlet and the two-way, solenoid, a low-level trigger mechanism, a flow control relief valve and other elements to enhance various modes of operation. The apparatus is capable of performing various operations, including closed-loop fluid cycle, fluid vacuum, fluid top-off, fluid exchange and fluid flow control.

25 Claims, 4 Drawing Sheets

METHOD AND APPARATUS FOR SERVICING ENGINE COOLING SYSTEMS

Matter enclosed in heavy brackets [ ] appears in the original patent but forms no part of this reissue specification; matter printed in italics indicates the additions made by reissue.

*This application is a continuation-in-part of U.S. patent application Ser. No. 09/184,621, now U.S. Pat. No. 6,062, 275, filed on Nov. 2, 1998, the benefit of priority from which is hereby claimed pursuant to 35 USC § 120.*

BACKGROUND OF THE INVENTION

1. Field of the Invention

The present invention relates to the field of vehicles' engines, and more specifically, the present invention is directed to servicing engines.

2. Background

Engine manufacturers highly recommend that engine cooling systems be serviced every 15,000 to 30,000 miles. Lack of proper service can cause engine problems due to the fact that old coolant in the vehicle's radiator system may no longer protect against rust or acids that can lead to a breakdown of the metal and aluminum parts in the engine. Periodic service intervals are recommended to protect the engine against overheating that can be caused by a breakdown of the coolant's protective properties.

To this end, automobile service stations utilize various systems and methods to replace old coolant in the radiator system with new coolant in accordance with the manufacturers' recommendation. Conventional systems, however, suffer from many problems. To mention a few, conventional systems cause coolant drainage and are environmentally hazardous. To prevent coolant drainage, service operators must place a pan under the vehicle to avoid coolant spill. Moreover, the radiator pressure cannot be released prior to removing the radiator cap which can place service operators in danger.

Furthermore, conventional systems require constant operator attention. For example, at the end of the coolant exchange, the operation must end immediately, otherwise the vehicle's coolant continues to be drained, and as a result, the vehicle's engine can overheat and be damaged. Even more, at the completion of the coolant exchange, the conventional systems require the operator to add more coolant manually in order to adjust the level of coolant in the radiator system. To that end the operator must either prepare a mixture of coolant and water, or prior to starting the coolant exchange process, save some to a separate container. At the end of the coolant exchange, the additional coolant must either be deposited in the service system tank or be added to the radiator system by the operator. Indeed, such methods are extremely labor intensive, unsafe and train consuming.

As another example of the shortcomings, in the existing systems, fluid flow control is achieved via a pressure switch that turns off the fluid flow completely when the system pressure reaches a predetermined level by stopping the system and/or engine and then restarting the system and/or engine when the system pressure falls below a second level. The on-to-off transitions are greatly harmful to the service system and the vehicle's engine.

Accordingly, an intense need exists for apparatus and method for servicing engine cooling systems that can safely and efficiently solve the existing problems in the art.

Further disadvantages of the related rat will become apparent to one skilled in the an through comparison of the drawings and specification which follow.

SUMMARY OF THE INVENTION

In accordance with the purpose of the present invention as broadly described herein, there is provided method and apparatus for servicing engine cooling systems.

In particular, in one embodiment, method and apparatus of the present invention includes connecting a service inlet of the apparatus to a system fluid outlet, connecting a service outlet of the apparatus to a system fluid inlet, and pumping out the old fluid from the system through the system outlet and the service inlet, pumping in, simultaneously with the pumping in step, the new fluid from a new fluid tank to the system through the system outlet and the service inlet. In one aspect of the present invention, pumping steps are terminated when new fluid level in the new fluid tank reaches a predetermined low-level.

In another aspect, when new fluid level in the new fluid tank reaches a predetermined low-level, a fluid path between the service inlet and the service outlet is established such that system fluid cycles through the apparatus, but is not drained.

In one aspect of the present invention, the system fluid may be topped off with the new fluid remained, below the low-level mark, in the new fluid tank.

In yet another aspect of the present invention, the service apparatus includes a pressure relief valve coupled to the pressure pump at one end and coupled to an inlet of the new fluid tank at another end and the relief valve opens, partially or completely, in response to system pressure.

In another separate aspect, the service apparatus vacuums or pumps out the old fluid without replacing it with the new fluid.

Other aspects of the present invention will become apparent with further reference to the drawings and specification, which follow.

BRIEF DESCRIPTION OF DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1A:
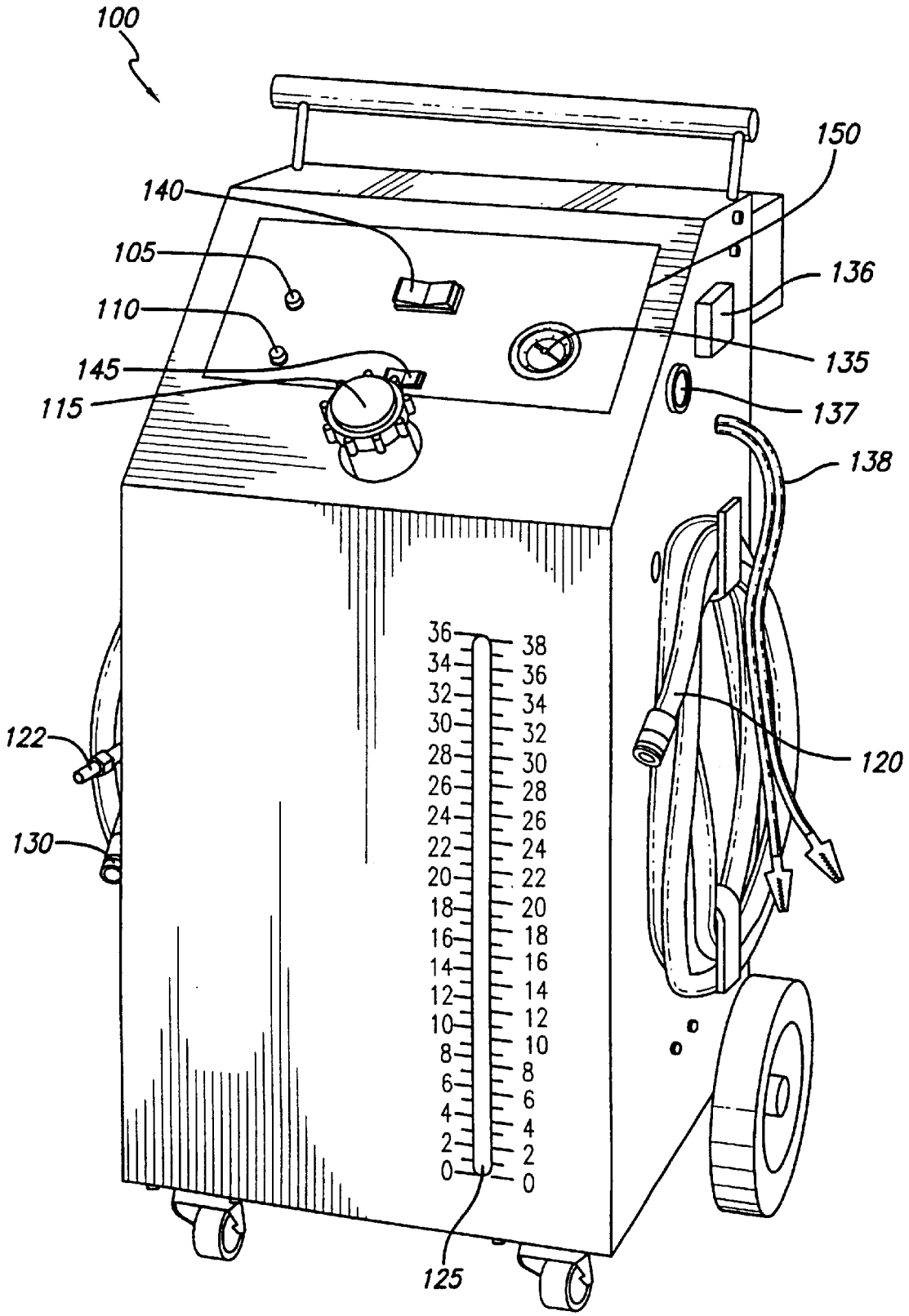
FIG. 1A depicts one embodiment of an engine cooling system service apparatus.

FIG. 1A illustrates an exemplary embodiment of an engine cooling system service apparatus 100 of the present invention. As depicted in FIG. 1A, the service apparatus 100 comprises a front control panel 150. The control panel 150 is shown in more derail in FIG. 1B.

Figure 1B:
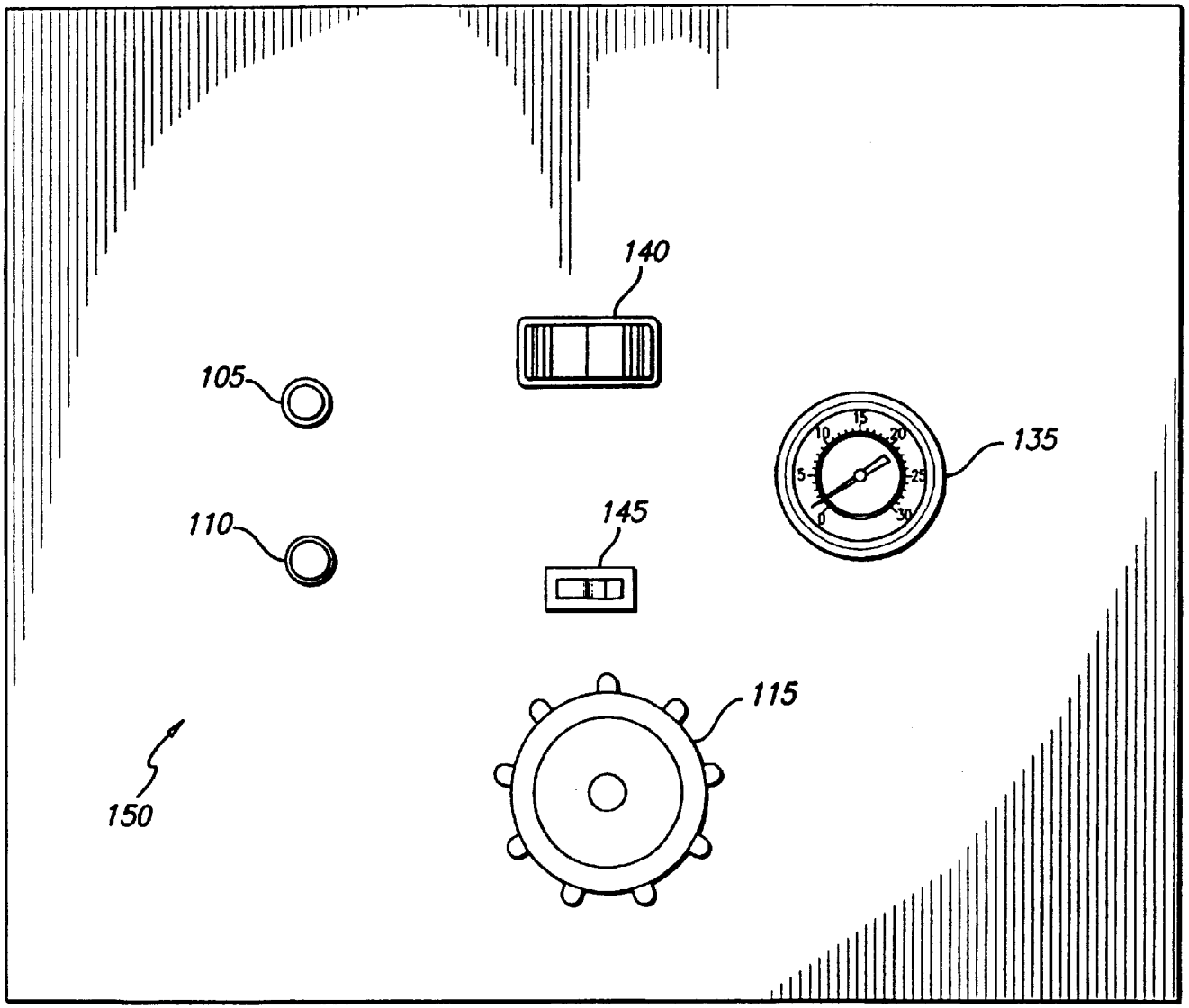
FIG. 1B depicts an example control panel of the engine cooling system service apparatus of FIG. 1A.

Referring to FIG. 1B, the control panel includes a fluid filer neck 115 for adding coolant mixture to a reservoir tank 265 (see FIG. 2) of the service apparatus 100. The control panel 150 further includes a tip-off switch 145 that is used to top-off or add coolant to the engine cooling system (not shown) upon completion of the service procedure.

The control panel 150 also includes a three-position mode switch 140 for selecting the service apparatus 100 modes of operation. In one embodiment, the mode switch 140, when placed in the center position, indicates that the service apparatus 100 is in off or by-pass mode of operation. The mode switch 140, when placed in the left position, indicates that the service apparatus 100 is in vacuum mode. The mode switch 140, when placed in the right position, indicates that the service apparatus is in fluid exchange mode.

The control panel 150 includes a low-fluid-level indicator light 110 that illuminates when coolant mixture in the reservoir tank 265 (see FIG. 2) falls below a predetermined low fluid level. The control panel 150 further includes a service-in-progress indicator fight 105 that illuminates when the service apparatus 100 is placed in fluid exchange mode. The control panel 150 also includes a pressure gauge 135 that displays fluid pressure in the service apparatus 100.

Figure 2:
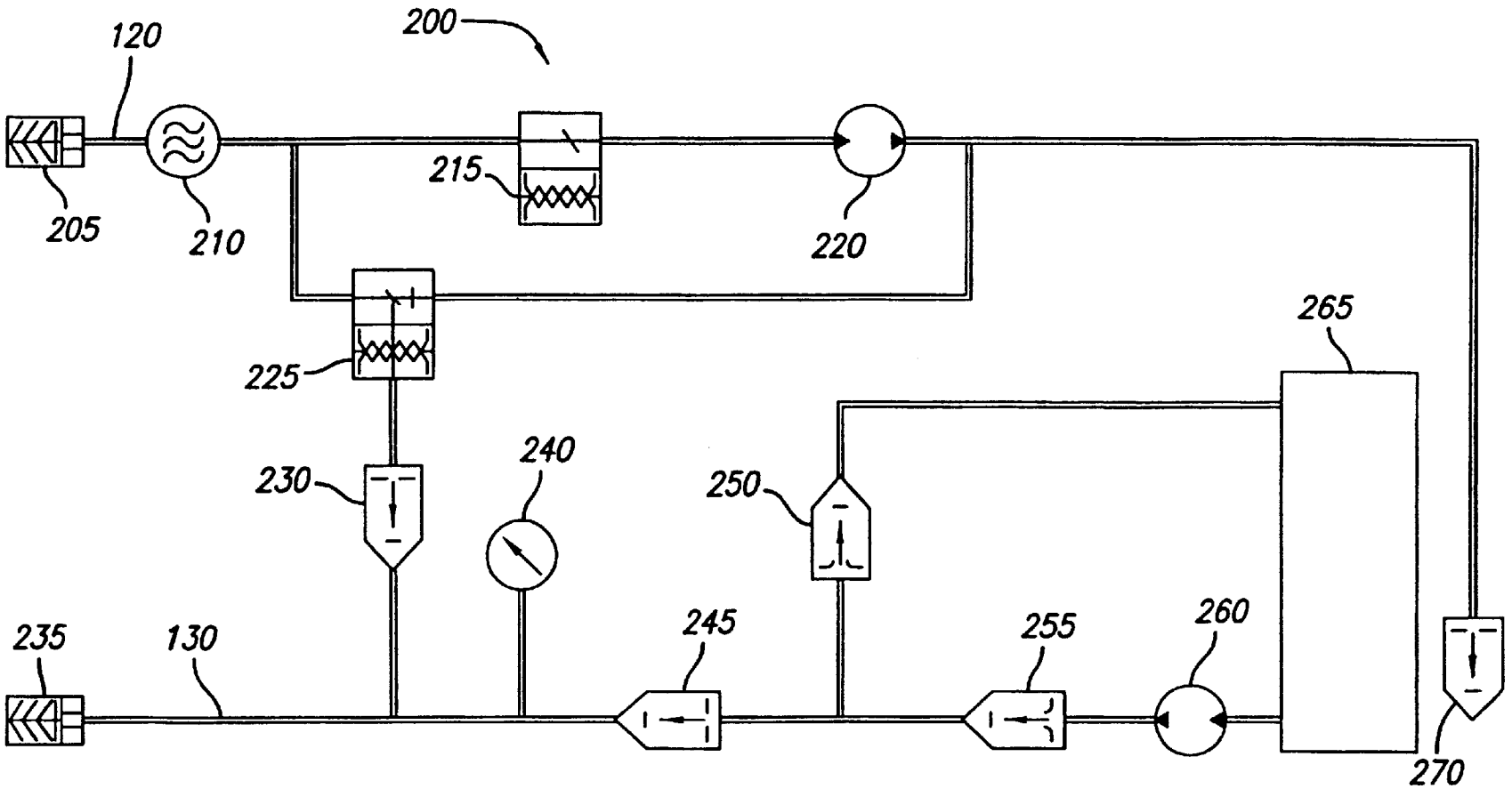
FIG. 2 depicts an example flow schematic of the engine cooling system service apparatus of FIG. 1A.

Turning back to FIG. 1A, it is shown that the service apparatus 100 also comprises a tank-level indicator 125 that indicates the coolant mixture level in the reservoir lank 265 (see FIG. 2). The service apparatus 100 further comprises a used coolant hose (inlet) 120, a new coolant hose (outlet) 130, a disposal hose 122, battery cables 138, a circuit breaker 136 and a warning alarm 137. The used coolant hose 120 is used to receive old coolant from the engine's outlet (not shown), and the new coolant hose 130 provides new coolant from the reservoir tank 265 (see FIG. 2) to the engine's inlet (not shown). The disposal hose 122 is used for transferring old coolant to a disposal tank (not shown). The battery cables 138 make it possible to utilize a vehicle's battery to provide power to the service apparatus 100. The circuit breaker 136 provides circuit protection to the internal circuitry of the service apparatus 100, as described below. The warning alarm 137 is used to alert the operator of the service apparatus 100, for example, when the reservoir tank 265 (see FIG. 2) falls below a certain level or becomes empty.

Figure 3:
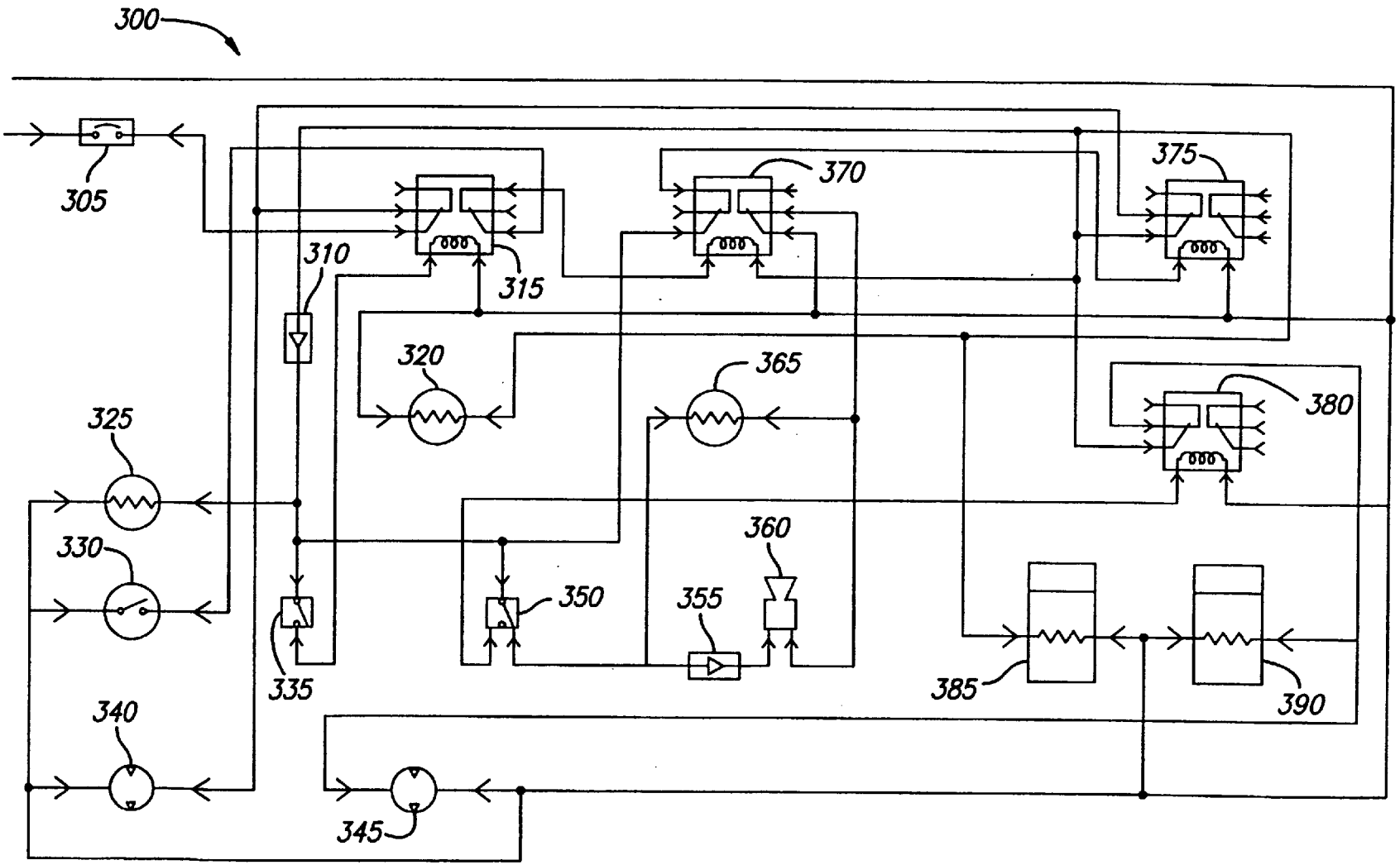
FIG. 3 depicts an example electrical schematic of the engine cooling system service apparatus of FIG; 1A.

The service apparatus 100 further comprises a flow system 200 and an electrical system 300, as shown in FIGS. 2 and 3.

To begin a service process of a vehicle's engine cooling system using the service apparatus 100, the battery cables 138 are connected to the vehicle's battery (not shown). Next, the disposal hose 122 should be inserted in the disposal tank (not shown). As a preferred step, at this point, the used coolant hose 120 should be inserted into the vehicle's overflow radiator tank (not shown). Next, the mode switch 140 should be placed in vacuum mode to evacuate approximately half of the amount of coolant in the vehicle's overflow tank. The made switch 140 should then be placed in the off position.

In the next step of the process, the vehicle's overflow tank hose (not shown) should be disconnected and then used coolant hose 120 should be connected to the vehicle's radiator nipple (not shown). Next, the mode switch 140 should be placed in vacuum mode to evacuate more coolant. At this stage, the vehicle's pressure release lever (not shown) should be pulled to release any pressure and then the vehicle's radiator cap should be removed.

At this point, the used coolant hose 120 should be disconnected from the vehicle's radiator nipple and should be inserted into the vehicle's radiator fill neck (not shown). Next, the mode switch 140 should be placed in vacuum mode to evacuate coolant mod coolant in the radiator preferably falls below the vehicle's upper radiator hose connection. As for the next step of the operation, the used coolant hose 120 should be removed from the vehicle's radiator and re-inserted into the vehicle's radiator overflow tank, to evacuate the overflow tank completely using the vacuum mode of the service apparatus 100.

At this sage, the vehicle's upper radiator hose should be disconnected from the vehicle's radiator inlet (not shown). Next, the new coolant hose 130 should be connected to the radiator inlet and the used coolant hose 120 should be connected to the vehicle's upper radiator hose. At this point, the mode switch 140 may be placed in fluid exchange mode m replace used coolant with new coolant from the reservoir tank 265. This operation should continue until the coolant level has reaches a middle point in the vehicle's radiator filler neck (not shown). Next, the mode switch 140 should be placed in off mode and the vehicle's radiator cap reinstalled securely.

At this step, the vehicle's engine should be started and the mode switch 140 of the service apparatus 100 should be placed in fluid exchange mode. This operation should continue until the tank-level indicator 125 indicates that new coolant has fallen below a low level or until the coolant in the disposal hose 122 appears to be clean. If either condition occurs, the mode switch 140 should be placed in off position and the vehicle's engine should be turned off.

In a preferred embodiment, when the reservoir tank 265 falls below a predetermined low level, the low-fluid-level indicator 110 illuminates and the warning alarm 137 sounds to indicate that the fluid exchange operation has ended. At this stage, the service apparatus 100 automatically reverts in the bypass or off mode and the vehicle's coolant simply passes through the service apparatus 100 and rerun to the vehicle in a closed loop fashion. Once the mode switch 140 is placed in off mode, the warning alarm's 137 audible sound becomes disabled.

At this point, the disposal hose 122 should be removed from the disposal tank and inserted into the vehicle's coolant recovery tank (not shown). Next, the service apparatus 100 should be placed in vacuum mode via the mode switch 140 to fill the vehicle's coolant recovery tank. Once the vehicle's coolant recovery tank reaches an acceptable fluid level, the switch mode 140 should be placed in off position to end the vacuum operation.

For the next step of the service operation, the pressure gauge 135 should be checked to verify that service apparatus 100 indicates zero or about zero pressure. Next, the vehicle's radiator cap (not shown) should be removed in order to assure that the coolant level in the vehicle's radiator is below the upper radiator hose connection point. If the coolant level in the radiator is unacceptable, the disposal hose 122 should be inserted in a disposal tank—or preferably a clean tank—and the mode switch should be placed in vacuum mode to drain the excess clean coolant from the vehicle's radiator. Next, the service apparatus 100 should be disconnected from the vehicle and the vehicle's upper radiator hose should be connected to the radiator and overflow tank hose to radiator nipple.

At this stage, the new coolant hose 130 should be inserted into the vehicle's radiator filler neck and the top-off switch 145 should be turned on, i.e., placed in top-off mode, in order to fill or top-off the coolant in the radiator. Preferably, similar top-off procedure should be followed to fill or top-off the coolant in the radiator overflow tank, if deemed necessary. At this point, the service process is complete in accordance with one exemplary method of the present invention.

Turning to the flow system 200, the aforementioned modes of operation of the service apparatus 100 are described below.

In one mode of operation, the service apparatus 100 is in off or by-pass mode when the made switch 140 is placed in off position. The off made is the default setting of the service apparatus 100. In this mode, when the service apparatus 100 is connected to an operating vehicle, the service apparatus is in a flow through or by-pass mode. In other words, the coolant fluid flowing from the vehicle passes through the service apparatus 100 and return to the vehicle's system.

Referring to FIG. 2, the off or by-pass mode may be described as follows. A used coolant hose connector 205, preferably a hydraulic connector, couples the used coolant hose 120 to the vehicle's radiator system. Similarly, a new coolant hose connector 235, preferably a hydraulic convector, couples the new coolant hose 130 to the vehicle's radiator system. In the by-pass mode, a vacuum solenoid 215, preferably a two-way solenoid, and a vacuum pump 220 are turned off such that no fluid may flow through the vacuum solenoid 215 or the vacuum pump 220. An exchange solenoid 225, preferably a three-way solenoid on die other hand, is set such that the fluid passes through the exchange solenoid 225 down to a used-coolant check valve 230. The used-coolant check valve 230 allows used fluid to flow through and towards the new coolant hose connector 235.

As shown, a new coolant check valve 245 is strategically positioned to prevent flow of used coolant inwards the new coolant reservoir tank 265. A filter 210 is preferably placed in the fluid path to prevent unwanted particles from blocking the fluid paths, the solenoids 215 and 225 or the vacuum pump 220. The pressure gauge 240 also provides the operator with the service apparatus 100 pressure based on which the operator may determine as to whether the flow has been restricted. Accordingly, in off or by-pass mode, used coolant enters the service apparatus 100, passes through the used coolant hose connector 205 and through the used coolant hose 120 through a filter 210, through the exchange solenoid 225, trough the used-coolant check valve 230 and then through the new coolant base 130 and the new coolant hose connector 235 back to the vehicle's radiator system (not shown).

Conventional service machines, however, merely provide an open hose that causes the vehicle's fluid to flow art of the vehicle's radiator system when the vehicle's engine is running. As a result, the vehicle's radiator system loses its fluid and the vehicle's engine overhears. In this exemplary embodiment of the present invention, on she other hand, a closed loop is established in the off mode that causes the vehicle's radiator fluid to return back to the radiator system while the vehicle's engine is running. In other words, no fluid is taken out of the vehicle's radiator and an fluid is added, rather the used radiator fluid simply cycles through the service apparatus 100 and returns back into the vehicle's radiator system The off mode of the present invention is even more advantageous in conjunction with the fluid exchange mode, as explained below, wherein the service apparatus automatically reverts to the off mode at the end of the fluid exchange mode and causes the fluid to circulate and not to be drawn out of the vehicle's radiator system at the end of the fluid exchange process. In conventional systems, however, the operator must manually control this time critical process.

In the vacuum mode of operation, the vacuum pump 220 and the vacuum solenoid 215 are activated hi apply vacuum to the vehicle's radiator system. As a result, used coolant is pulled from the vehicle's system through the used coolant hose connector 205 and the used coolant hose 120, through the filter 210, the vacuum solenoid 215 and the vacuum pump 220. The old coolant then flows to a waste check valve 270 to the disposal tank (not shown) or a clean tank, if clean fluid is being vacuumed.

The flow system 200 also includes a pressure pump relief valve 255 that can prevent an unwanted hydraulic pull that may be created due to bottom errors. An unwanted hydraulic pull may occur if the operator erroneously connects the new fluid hose 130 and the used fluid hose 120 to the vehicle's system in place of the other. In this case, an unwanted hydraulic pull is created between the new coolant hose connector 235 and the used coolant hose connector 205 and the vacuum pump 220 that may cause new fluid to be drawn from the new fluid reservoir tank 265. The pressure pump relief valve 255 is positioned to prevent new fluid to be down from the reservoir 265 as a result of a hydraulic pull.

In conventional service machines, in order to prevent drainage of coolant into public drainage system, the operator must place a pan under the vehicle to retain spills. The performance of this step is required by the environmental law to prevent drainage of hazardous materials.

When the service apparatus 100 is placed in fluid exchange made via the mode switch 140, the service-in-progress indicator fight 105 illuminates, and a pressure pump 260 and the exchange solenoid 225 are activated. In this mode, the old fluid enters the service apparatus 100 through the used coolant hose connector 205 and the used coolant hose 120. The old fluid then flows through the filter 210, bypassing the path including the vacuum solenoid 215 and the vacuum pump 220, because they are both in off state, but flowing through the exchange solenoid 225 to reach the waste check valve 270. The exchange solenoid's 225 path to the used-coolant check valve 230 is deactivated so that flow of used fluid towards the used-coolant check valve 230 is not allowed. Furthermore, the pressure pump 260 is activated to pump new fluid out of the new fluid reservoir tank 265 towards the pressure pump relief valve 255, passed the new fluid check valve 245 towards the new fluid hose 130 and the new fluid hose connector 235 into the vehicle's radiator system. An excess pressure relief valve 250 is preferably positioned such that it is connected to the reservoir tank 265 at one end and between the pressure pump relief valve 255 and the new fluid check valve 245 at the other end. The purpose of the excess pressure relief valve 250 is to allow new fluid to revert back into the reservoir tank 265 partially incompletely depending upon the rate at which the vehicle's system is accepting new fluid. The excess pressure relief valve 250 opens based on excess pressure, so that the vehicle's engine or the service apparatus 100 do not have to be shipped and restarted to adjust inflow or outflow of the fluid. Rather, the fluid flow is automatically controlled via the excess pressure relief valve 250. In some conventional systems, an electrical switch is used to stop the pressure pump at a given pressure. Accordingly, in such machines, the flow of fluid cannot be partially controlled but path is either closed to open.

During the fluid exchange mode, the pressure gauge 240 provides the service apparatus 100 pressure to the operator, so the operator may determine the flow speed and whether the flow is restricted. During this operation, a used-coolant check valve 230 is positioned to prevent flow of fluid to the exchange solenoid 225. The used-coolant check valve 230, however, may not be used in some embodiments, since the exchange solenoid 225 may itself block flow of new fluid. Yet, the used-coolant valve 230 serves an advantageous purpose, for example in the vacuum mode, wherein the operator may erroneously utilize the new coolant hose 130 rather man the used coolant hose 120 to vacuum fluid.

The top-off mode of operation is activated when the top-off switch 145 is turned on. As described above, in one mode of operation the fluid exchange mode terminates when new fluid in the reservoir tank 265 reaches a predetermined low level. At this stage, the reservoir tank 265 preferably contains approximately three quarts of new fluid. The top-off mode of the service apparatus 100 overrides the low-level shut-down and allows more fluid, below the low-level in the reservoir tank 265, to be withdrawn from the reservoir tank 265 in order to top-off the vehicle's radiator system. In conventional systems, the operator must either make a batch of new fluid by mixing water and coolant or save some new fluid in a separate container in order to manually top-off the cooling system and fill the radiator overflow tank at the end of the fluid exchange operation.

Activating the top-off switch 145 causes the low-fluid-level indicator fight to go off. In this mode, the pressure pump 260 is activated causing new fluid to be pump out of the reservoir tank 265 towards the pressure pump relief valve 255, passed through the new fluid check valve 245 to the new fluid hose 130 and the new fluid hose connector 235 into the vehicle's radiator system. During the top-off mode, some new fluid may revert back to the reservoir tank 265 via the excess pressure relief valve 250. As explained above, the excess pressure relief valve 250 opens partially or completely depending upon the back pressure.

Turning to FIG. 3, an exemplary electrical system 300 of the present invention is illustrated. The electrical system 300 include a circuit breaker element 305 in connection with the circuit breaker 136. The circuit breaker element 305 provide, protection to the electrical system 300 against unwanted voltage fluctuations. The electrical system 300 further includes four relays 315, 370, 375 and 380 that are set up according to the modes of operation of the service apparatus 100. The electrical system 300 also includes electrical connections for a service fight 320 and a low-level fight 365 to provide illumination to the service-in-progress indicator light 105 and the low-level-fluid indicator light 110, respectively. FIG. 3 further illustrates that the service light 320 is in communication with a diode 310 and a top-off switch 335 via the relay 315. As a result in the fluid exchange mode, the relay 315 is activated such that the service fight 320 provides voltage in illuminate the service-in-progress indicator light 105 and also to turn the pressure pump 340 on.

The electrical system 300 further comprises pump electrical connections 340 and 345 to provide electrical voltage to pressure pump 260 and the vacuum pump 220, respectively. A low level switch 330 is also provided to terminate the exchange fluid mode and cause the service apparatus 100 to revert to off mode when the reservoir tank 265 reaches a predetermined lowfluid level. As shown, the electrical system 300 also provides an alarm electrical connection 360 to activate in deactivate the warning alum 137. The alarm electrical connection is further connected to an harm diode 355 that is coupled to the relay 370. The electrical system 300 further comprises solenoid electrical connections 385 and 390 to control the operation of the vacuum solenoid 215 and the exchange solenoid 225, respectively.

While particular embodiments, implementations, and implementation examples of the present invention have been described above, it should be understood thin they have been presented by way of example only, and not as limitations. The breadth and scope of the present invention is defined by the following claims and their equivalents, and is not limited by the particular embodiments described herein.

What is claimed is:

1. A service apparatus for servicing a system, said apparatus comprising:

a service inlet a first pump;

a service outlet;

a fluid tank;

a second pump interposed between said service outlet and said fluid tank; and a second solenoid interposed between said service outlet and said first solenoid;

wherein an inlet of said fist solenoid is connected to an inlet of said second solenoid, without said service apparatus being connected to said system.

2. The service apparatus of claim 1 further comprising a low-level fluid trigger causing said second pump to halt when said second fluid in said tank reaches a predetermined low-level.

3. The service apparatus of claim 1 further comprising a first check valve interposed between said service outlet and said second solenoid.

4. The service apparatus of claim 1 further comprising a filter interposed between said service inlet at one end and said inlets of said first and second solenoids at another end.

5. The service apparatus of claim 1 further comprising a fluid relief valve coupled to said second pump at one end and coupled to said service outlet at another end.

6. The service apparatus of claim 1 further comprising a pressure relief valve coupled b said second pump at one end and coupled to an inlet of said tank at another end wherein said pressure relief valve opens in response to system pressure.

7. The service apparatus of claim 1 further comprising a find relief valve coupled to said second pump at one end and coupled to a first check valve at another end, wherein said first check valve is coupled on said service outlet.

8. The service apparatus of claim 1 further comprising a check valve coupled to an output of said first pump.

9. The service apparatus of claim 1 further comprising a pressure gauge interposed between said second pump and said service outlet.

10. The service apparatus of claim 1, wherein said second solenoid is coupled at a first outlet to said service outlet, at a second outlet to an output of said first pump and at said inlet of said second solenoid in said service inlet.

11. A service apparatus for servicing a system said apparatus comprising:

a service inlet;

a first pump;

a first solenoid interposed between said first pump and said service inlet a service outlet;

a fluid tank;

a second pump interposed between said service outlet and said fluid tank; and a second solenoid interposed between said service outlet and said first solenoid;

wherein said second solenoid is a three-way solenoid coupled at a first outlet to said service outlet, at a second outlet to an output of said first pump and at an inlet of said second solenoid to said service inlet.

12. The service apparatus of claim 11 further comprising a low-level fluid trigger causing said second pump to halt when said second fluid in said tank reaches a predetermined low-level, and causing said three-way solenoid to establish a fluid path between said service inlet and said service outlet such that system fluid cycles through said apparatus.

13. The service apparatus of claim 11 further comprising a first check valve interposed between said service outlet and said second solenoid.

14. The service apparatus, of claim 11 further comprising a filter interposed between said service inlet at one end and said inlet, of said first and second solenoids at another end.

15. The service apparatus of claim 11 further comprising a fluid relief valve coupled to said second pump to one end and coupled to said service outlet at another end.

16. The service apparatus of claim 11 further comprising a pressure relief valve coupled to said second pump at oft end and coupled to an inlet of said tank at another end, wherein said pressure relief valve opens in response to system pressure.

17. The service apparatus of claim 11 further comprising a fluid relief valve coupled to said second pump at one end and coupled to a first check valve at another end, wherein said first check valve is coupled to said service outlet.

18. The service apparatus of claim 11 further comprising a check valve coupled to an output of said first pump.

19. The service apparatus of claim 11 further comprising a pressure gauge interposed between said second pump and said service outlet.

20. A method of servicing a system having an inlet and an outlet, said method comprising the steps of:

connecting a service inlet *of a service apparatus* to said system outlet;

connecting a service outlet *of said apparatus* to said system inlet; initiating a fluid-replacement process including the steps of:

pumping out a first fluid from said system through said system outlet and said service inlet; and pumping in, simultaneously with said pumping out step, a second fluid from a second fluid tank to said system through said [system] *service* outlet and said [service] *system* inlet;

terminating said fluid-replacement process; and cycling said second fluid, pumped into said system, through said apparatus, after said terminating step.

21. The method of claim 20, wherein in said step of cycling, said second fluid enters said apparatus through said service inlet and exits said apparatus through said service outlet back into said system.

22. The method of claim 20 further comprising a step of cycling said first fluid through said apparatus prior to said step of pumping out said first fluid.

23. The method of claim 20, wherein in said terminating step, said pumping steps terminate when second fluid level in said second fluid tank reaches a predetermined low-level.

24. A service apparatus for servicing a system having an inlet and an outlet, said apparatus comprising:

a service inlet for receiving fluid from said system outlet;

a service outlet coupled to said service inlet and directing said fluid to said system inlet;

a filter; and a solenoid;

wherein said fluid cycles through said service apparatus and said system, and wherein said filter is coupled at one end to said service inlet and at another end to a first end of said solenoid, and wherein a second end of said solenoid is coupled to said service outlet.

25. A service apparatus for servicing a system having an inlet and an outlet, said apparatus comprising:

a service inlet for receiving fluid from said system outlet;

a service outlet coupled to said service inlet and directing said fluid to said system inlet;

a filter; and a solenoid;

wherein said fluid cycles through said service apparatus and said system, and wherein said filter is coupled at one end to said service inlet and at another end to a first end of said solenoid, a second end of said solenoid is coupled to one end of a check valve, and wherein another end of said check valve is coupled to said service outlet.

* * * * *